United States Patent
Marcondes et al.

(10) Patent No.: US 8,000,239 B2
(45) Date of Patent: Aug. 16, 2011

(54) METHOD AND SYSTEM FOR BANDWIDTH ALLOCATION USING ROUTER FEEDBACK

(75) Inventors: Cesar A. C. Marcondes, Los Angeles, CA (US); Anders D. Persson, San Mateo, CA (US); Darrin P. Johnson, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 525 days.

(21) Appl. No.: 11/639,090

(22) Filed: Dec. 14, 2006

(65) Prior Publication Data
US 2008/0144511 A1    Jun. 19, 2008

(51) Int. Cl.
*H04L 12/26*   (2006.01)
(52) U.S. Cl. ............................ 370/232; 370/238
(58) Field of Classification Search ....... 370/229–235.1, 370/236.1–238, 352, 395.1; 709/233, 238
See application file for complete search history.

(56) References Cited

U.S. PATENT DOCUMENTS

| | | | |
|---|---|---|---|
| 5,852,602 A * | 12/1998 | Sugawara ................ | 370/235.1 |
| 6,081,517 A * | 6/2000 | Liu et al. ................. | 370/352 |
| 6,377,550 B1 * | 4/2002 | Prasad ..................... | 370/236.1 |
| 2002/0143981 A1 * | 10/2002 | DeLima et al. .......... | 709/233 |
| 2005/0015511 A1 * | 1/2005 | Izmailov et al. ......... | 709/238 |
| 2005/0152371 A1 * | 7/2005 | Qu .......................... | 370/395.1 |

OTHER PUBLICATIONS

Katabi, D. et al.; "Congestion Control for High Bandwidth-Delay Product Networks"; SIGCOMM'02, Aug. 19-23, 2002, Pittsburgh, Pennsylvania; Copyright 2002; 14 pages.

Floyd, S. et al.; "Quick-Start for TCP and IP"; Internet Engineering Task Force; Jun. 14, 2006; http://www3.ietf.org/proceedings/06jul/IDs/draft-ietf-tsvwg-quickstar/; 77 pages.

* cited by examiner

*Primary Examiner* — Andrew Lai
(74) *Attorney, Agent, or Firm* — Osha • Liang LLP

(57) ABSTRACT

In general, the invention relates to a method for managing a network connection. The method includes receiving a request for the network connection from a host, where the network connection is associated with an overlay network. The method further includes sending, in response to the request, a first available bandwidth per flow to the host, and receiving packets from the host. The packets received from the host are associated with the network connection and the initial packet transmission rate of the packets over the network connection is based on the first available bandwidth per flow. Further, the first available bandwidth per flow is obtained by probing a first router in the overlay network to obtain a first available bandwidth associated with the first router.

18 Claims, 5 Drawing Sheets

METHOD AND SYSTEM FOR BANDWIDTH ALLOCATION USING ROUTER FEEDBACK

BACKGROUND

In the last several years, the Internet has evolved towards widespread sharing of all forms of information. The ease of creating a public website has led to a culture of individual self-publishing and co-operative publishing in the form of blogs, podcasts, wikis, and photo and video sharing. Voice Over Internet Protocol (VoIP) services have allowed the expansion of the Internet's communication capabilities. Sophisticated on-demand content provisioning has enabled the delivery of all forms of media across the Internet, including traditional media forms, such as newspapers, radio, television, and movies. Greater bandwidth has moved traditionally local file backups and mirrors to locations that are accessed over a network. In addition, the Internet's peer-to-peer infrastructure has given rise to real-time data transmission as well as file sharing.

These changes have led to increased heterogeneity of media types and traffic, increased network complexity, reduced latency requirements, and increased bandwidth requirements. Often, network traffic seamlessly transitions through multiple wireless Local Area Network (LAN) standards (e.g., 802.11a, 802.11b, 802.11g, 802.11n), wireless Personal Area Network (PAN) standards such as Bluetooth® (Bluetooth is a registered trademark of Bluetooth Sig, Inc. of Delaware), wired standards such as Ethernet, and even storage area networks (SANs) and any associated network storage protocols. Furthermore, network traffic itself is composed of many different types of data, which are sent using various packet transmission patterns and protocols. For example, streaming video traffic is transmitted using a different protocol from VoIP traffic. Additionally, network applications, from weather simulations and telemetry to streaming media and VoIP, are demanding increased bandwidth and reduced latency from the Internet.

To operate in a heterogeneous, complex environment and meet bandwidth and latency requirements, a network connection is customized to handle different traffic patterns, types of data transmitted, and types of transmission media. However, before customization takes place, the network connection is characterized appropriately. For example, multiple Transmission Control Protocol (TCP) congestion control algorithms exist, with each algorithm designed to handle a particular set of network conditions. However, to effectively use a particular TCP congestion control algorithm, the network conditions are determined, and the appropriate congestion control algorithm is selected for the established network conditions. Mechanisms are also put in place to deal with changing network conditions, traffic patterns, and network usage once the TCP congestion control algorithm is implemented.

SUMMARY

In general, in one aspect, the invention relates to a method for managing a network connection. The method includes receiving a request for the network connection from a host, wherein the network connection is associated with an overlay network, sending, in response to the request, a first available bandwidth per flow to the host, and receiving packets from the host, wherein the packets are associated with the network connection, and wherein an initial packet transmission rate of the packets over the network connection is based on the first available bandwidth per flow, wherein the first available bandwidth per flow is obtained by probing a first router in the overlay network to obtain a first available bandwidth associated with the first router.

In general, in one aspect, the invention relates to a system. The system includes an overlay network. Further, the overlay network includes a plurality of routers and a plurality of logical links connecting each of the plurality of routers to at least one of the other plurality of routers. Further, the overlay network is configured to receive a request for the network connection from a host, wherein the network connection is associated with the overlay network, send, in response to the request, a first available bandwidth per flow to the host, and receive packets from the host, wherein the packets are associated with the network connection, and wherein an initial packet transmission rate of the packets over the network connection is based on the first available bandwidth per flow, wherein the first available bandwidth per flow is obtained by probing a first router from the plurality of routers to obtain a first available bandwidth associated with the first router.

In general, in one aspect, the invention relates to a computer readable medium containing software instructions for executing a method for managing a network connection. The method includes receiving a request for the network connection from a host, wherein the network connection is associated with an overlay network, sending, in response to the request, a first available bandwidth per flow to the host, and receiving packets from the host, wherein the packets are associated with the network connection, and wherein an initial packet transmission rate of the packets over the network connection is based on the first available bandwidth per flow, wherein the first available bandwidth per flow is obtained by probing a first router in the overlay network to obtain a first available bandwidth associated with the first router.

Other aspects of the invention will be apparent from the following description and the appended claims.

DETAILED DESCRIPTION

Figure 1:
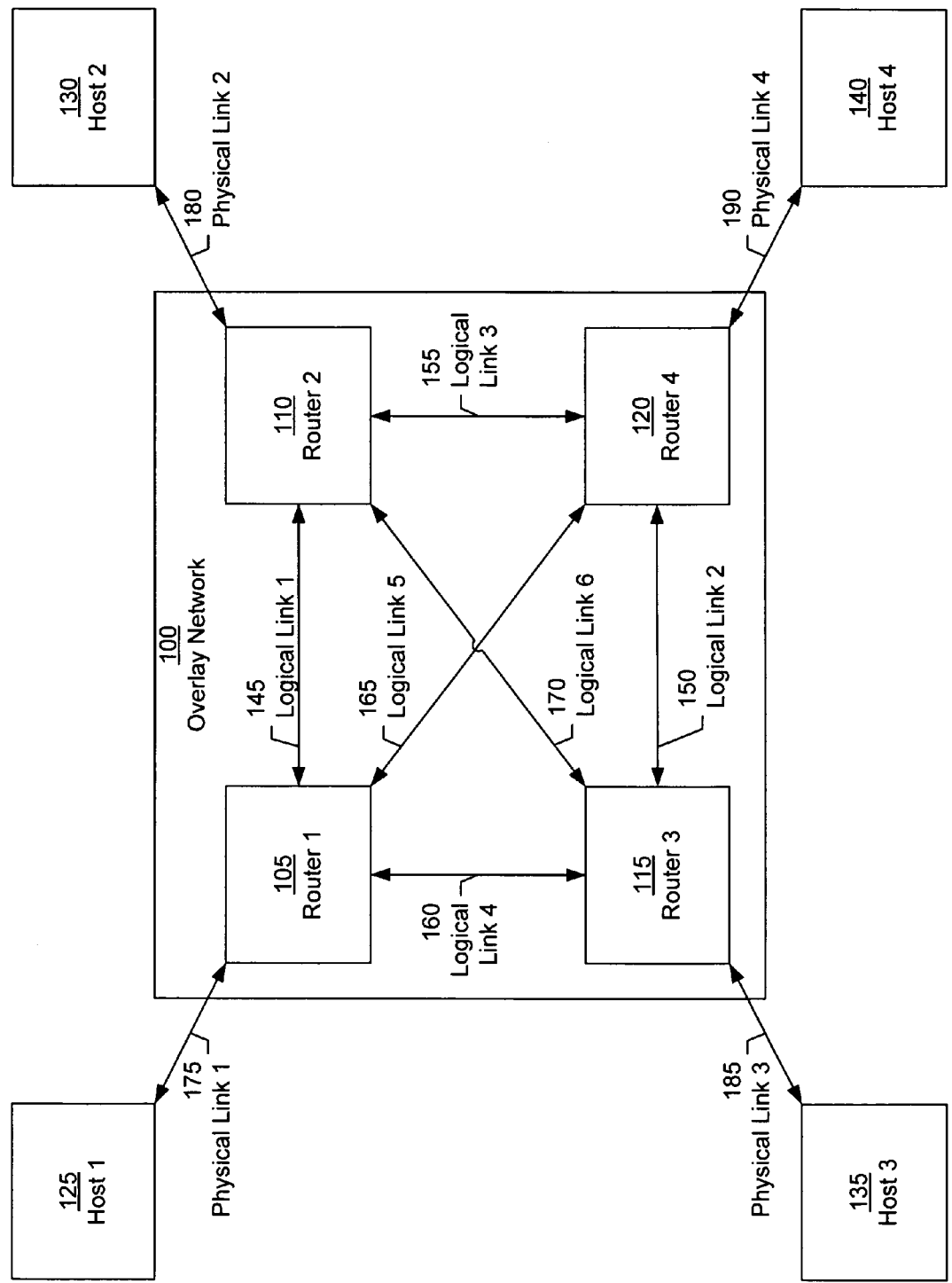
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to manage a network connection between two hosts. The network connection may be used to transmit packets from one host to another. In addition, the packets may be transmitted from one host to another over one or more networks.

More specifically, embodiments of the invention provide a method and system to specify an initial bandwidth for packet transmission over a network connection. In one embodiment of the invention, the network connection may pass through an overlay network, which provides the initial bandwidth by probing routers in the overlay network for available bandwidth and dividing the available bandwidth by the number of expected flows. The number of expected flows may be determined, for example, by using historical data such as usage and flow patterns. Once packets are transmitted at the initial bandwidth, subsequent packet transmission may be regulated using a congestion control algorithm.

FIG. 1 shows a schematic diagram of a system in accordance with one or more embodiments of the invention. The system of FIG. 1 includes an overlay network (100), which includes multiple routers (e.g., router 1 (105), router 2 (110), router 3 (115), router 4 (120)) connected by multiple logical links (e.g., logical link 1 (145), logical link 2 (150), logical link 3 (155), logical link 4 (160), logical link 5 (165), logical link 6 (170)). The overlay network (100) connects multiple hosts (e.g., host 1 (125), host 2 (130), host 3 (135), host 4 (140)) to one another. Each of the components in FIG. 1 is described in further detail below.

In one embodiment of the invention, the overlay network (100) corresponds to a virtual computer network built on top of one or more physical networks (not shown). Physical networks may include local area networks (LANs), wide area networks (WANs), campus area network (CANs), metropolitan area network (MANs), home area networks (HANs), and ah hoc network, a wireless network, or any combination thereof. Physical networks may be created using one or more physical links (e.g., physical link 1 (175), physical link 2 (180), physical link 3 (185), physical link 4 (190)), which may be made by connecting wires, wireless access points (WAPs), satellite links, etc. In one or more embodiments of the invention, physical networks allow computers connected to the networks, or hosts (e.g., host 1 (125), host 2 (130), host 3 (135), host 4 (140)), to communicate with one another. In one or more embodiments of the invention, a host (e.g., host 1 (125), host 2 (130), host 3 (135), host 4 (140)) communicates with another host by transmitting a series of packets through the physical network(s) to the other host. In one or more embodiments of the invention, packets are formatted and transmitted according to one or more network protocols, such as Transmission Control Protocol (TCP), User Datagram Protocol (UDP), Internet Protocol (IP), Address Resolution Protocol (ARP), File Transfer Protocol (FTP), etc. In one or more embodiments of the invention, each network protocol used by the physical network(s) specifies a set of methods involved in the transmission of data between hosts (e.g., host 1 (125), host 2 (130), host 3 (135), host 4 (140)) over the physical network(s).

In one or more embodiments of the invention, packets are transmitted from one host (e.g., host 1 (125), host 2 (130), host 3 (135), host 4 (140)) to another through routers (e.g., router 1 (105), router 2 (110), router 3 (115), router 4 (120)) on the physical network(s). In one or more embodiments of the invention, a router (e.g., router 1 (105), router 2 (110), router 3 (115), router 4 (120)) sends packets across one or more physical networks toward their destinations through the process of routing. In one or more embodiments of the invention, routing protocols, such as Routing Information Protocol (RIP), Open Shortest Path First (OSPF), and Intermediate System to Intermediate System (IS-IS) are used by the routers (e.g., router 1 (105), router 2 (110), router 3 (115), router 4 (120)) to route packets to the appropriate packet destinations, or hosts (e.g., host 1 (125), host 2 (130), host 3 (135), host 4 (140)), on the physical network(s). In addition, one or more routing metrics, such as bandwidth, delay, hop count, path cost, load, reliability, etc., may be used to determine how packets are routed between hosts (e.g., host 1 (125), host 2 (130), host 3 (135), host 4 (140)).

In one or more embodiments of the invention, the overlay network (100) is created on top of the physical network(s) using a distributed hash table (DHT). Examples of DHTs include Content Addressable Networks (CANs), Chord, Pastry, and Tapestry. In one or more embodiments of the invention, routers (e.g., router 1 (105), router 2 (110), router 3 (115), router 4 (120)) and hosts (e.g., host 1 (125), host 2 (130), host 3 (135), host 4 (140)) in the physical network(s) are created as nodes in the DHT. The nodes are then entered as elements into a hash table and associated with unique keys, such as 160-bit strings. In one or more embodiments of the invention, consistent hashing is used to map keys to nodes in the overlay network (100). In one or more embodiments of the invention, keys of the DHT are used to route packets to the nodes corresponding to those keys.

In addition to nodes, which include hosts (e.g., host 1 (125), host 2 (130), host 3 (135), host 4 (140)) and routers (e.g., router 1 (105), router 2 (110), router 3 (115), router 4 (120)), the overlay network (100) also includes multiple logical links (e.g., logical link 1 (145), logical link 2 (150), logical link 3 (155), logical link 4 (160), logical link 5 (165), logical link 6 (170)) between nodes. In one or more embodiments of the invention, a logical link (e.g., logical link 1 (145), logical link 2 (150), logical link 3 (155), logical link 4 (160), logical link 5 (165), logical link 6 (170)) is made on top of one or more physical links (e.g., physical link 1 (175), physical link 2 (180), physical link 3 (185), physical link 4 (190)) in the overlay network.

Those skilled in the art will appreciate that a single logical link (e.g., logical link 1 (145), logical link 2 (150), logical link 3 (155), logical link 4 (160), logical link 5 (165), logical link 6 (170)) between two routers (e.g., router 1 (105), router 2 (110), router 3 (115), router 4 (120)) may be made from multiple physical links (e.g., physical link 1 (175), physical link 2 (180), physical link 3 (185), physical link 4 (190)) and additional routers between the two routers. Alternatively, a logical link (e.g., logical link 1 (145), logical link 2 (150), logical link 3 (155), logical link 4 (160), logical link 5 (165), logical link 6 (170)) may correspond to a single physical link (e.g., physical link 1 (175), physical link 2 (180), physical link 3 (185), physical link 4 (190)) between two nodes in the overlay network. In one or more embodiments of the invention, logical links (e.g., logical link 1 (145), logical link 2 (150), logical link 3 (155), logical link 4 (160), logical link 5 (165), logical link 6 (170)) are created between nodes in the overlay network (100) using routing metrics mentioned above, such as bandwidth, delay, hop count, etc. Overlay network (100) creation is explained in further detail in FIG. 2 below.

In one or more embodiments of the invention, the overlay network (100) provides an initial bandwidth for transmitting packets between hosts (e.g., host 1 (125), host 2 (130), host 3 (135), host 4 (140)) connected to the overlay network (100). For example, if host 1 (125) establishes a TCP connection with host 4 (140) in order to transmit packets to host 4 (140), the overlay network (100) provides an initial bandwidth to host 1 (125) for transmitting packets to host 4 (140). In one or more embodiments of the invention, the initial bandwidth provided to a host (e.g., host 1 (125), host 2 (130), host 3 (135), host 4 (140)) for a network connection on the overlay network (100) is determined by probing the available bandwidth between the two hosts on the network connection, determining the number of expected flows along the path between the two hosts, calculating the available bandwidth per flow from the available bandwidth and number of expected flows, and reporting the available bandwidth per flow to the host. Bandwidth calculation is explained in greater detail in FIG. 3 below.

In one or more embodiments of the invention, one or more available bandwidth estimation techniques are used to estimate the available bandwidth between routers (e.g., router 1 (105), router 2 (110), router 3 (115), router 4 (120)) in the overlay network (100). Available bandwidth estimation techniques and measurement tools include netest, pathChirp, Pathload, and Spruce. In one or more embodiments of the invention, the number of expected flows is estimated using historical network traffic data. For example, network traffic data may be logged using a tool such as Multi-Router Traffic Grapher (MRTG). The number of expected flows may then be estimated from the traffic data and/or incoming flow patterns using one or more estimation techniques. In one or more embodiments of the invention, the available bandwidth per flow is calculated by dividing the available bandwidth by the number of expected flows.

In one or more embodiments of the invention, the available bandwidth per flow is updated when a bandwidth update trigger is received by a router (e.g., router 1 (105), router 2 (110), router 3 (115), router 4 (120)). In one or more embodiments of the invention, the bandwidth update trigger occurs at a set period of time from the last bandwidth update trigger. For example, a bandwidth update trigger may occur every five minutes. As a result, the available bandwidth per flow is recalculated every five minutes based on available bandwidth estimates and number of expected flow estimates. Those skilled in the art will appreciate that other bandwidth update triggers may exist. For example, a bandwidth update trigger may occur when a new node/router (e.g., router 1 (105), router 2 (110), router 3 (115), router 4 (120)) is added to the overlay network (100), a node is removed from the overlay network (100), the number of flows is significantly higher or lower than the number of expected flows, etc.

In one or more embodiments of the invention, the initial bandwidth is provided to a host (e.g., host 1 (125), host 2 (130), host 3 (135), host 4 (140)) as the host establishes a connection with another host on the overlay network (100). In one or more embodiments of the invention, the initial bandwidth is reported as a field in a packet sent from the destination host (e.g., host 1 (125), host 2 (130), host 3 (135), host 4 (140)) to the source host. For example, host 1 (125) may use TCP to establish a connection with host 2 (130). As a result, host 1 (125) sends a SYN packet to host 2 (130). Host 2 (130) then transmits an SYN-ACK packet to host 1 (125). As the SYN-ACK packet is routed through the routers (e.g., router 1 (105), router 2 (10), router 3 (115), router 4 (120)) in the overlay network (100), a field is added by one of the routers to the SYN-ACK packet that specifies the initial bandwidth host 1 (125) can use to transfer packets to host 2 (130). After sending an ACK packet back to host 2 (130), host 1 (125) may then begin transferring data packets at the initial bandwidth provided by the overlay network (100). Alternatively, if host 1 (125) establishes a connection with host 2 (130) to request data from host 2 (130), the initial bandwidth may be provided by the overlay network (100) to host 2 (130) as a header in the ACK packet from host 1 (125) to host 2 (130). In one or more embodiments of the invention, the initial bandwidth is provided in a TCP optional header in the SYN-ACK or ACK packet.

In one or more embodiments of the invention, packets between hosts (e.g., host 1 (125), host 2 (130), host 3 (135), host 4 (140)) on the overlay network (100) are transferred using the path that provides the best available bandwidth per flow. For example, if host 1 (125) establishes a connection with host 4 (140), packets from host 1 (125) to host 4 (140) may be sent to router 1 (105) through physical link 1 (175), to router 2 (110) through logical link 1 (145), to router 4 (120) through logical link 3 (155), and finally to host 4 (140). On the other hand, packets may be routed from router 1 (105) to router 3 (115) via logical link 4 (160), then to router 4 (120) through logical link 2 (150) before arriving at host 4 (140). A third option may be to send packets from router 1 (105) directly to router 4 (120) through logical link 5 (165).

Those skilled in the art will appreciate that each of the three options for transferring packets from host 1 (125) to host 4 (140) represents a path between host 1 (125) and host 4 (140). Those skilled in the art will also appreciate that each path between host 1 (125) and host 4 (140) includes certain network characteristics, such as round trip time, delay, capacity, available bandwidth, packet loss rate, etc. Consequently, one path may perform better than another in transmitting packets between host 1 (125) and host 4 (140). To determine the best performing path, the available bandwidth per flow may be calculated for all possible paths between host 1 (125) and host 4 (140). For example, the available bandwidth per flow for a path may be determined by using the available bandwidth per flow at the path's bottleneck. In other words, the lowest available bandwidth per flow along a path is used as the overall available bandwidth per flow for that path. The path with the highest overall available bandwidth per flow is then used to transmit packets between host 1 (125) and host 4 (140), and the available bandwidth per flow for that path is reported to host 1 (125) in the SYN-ACK packet from host 4 (140).

Figure 2:
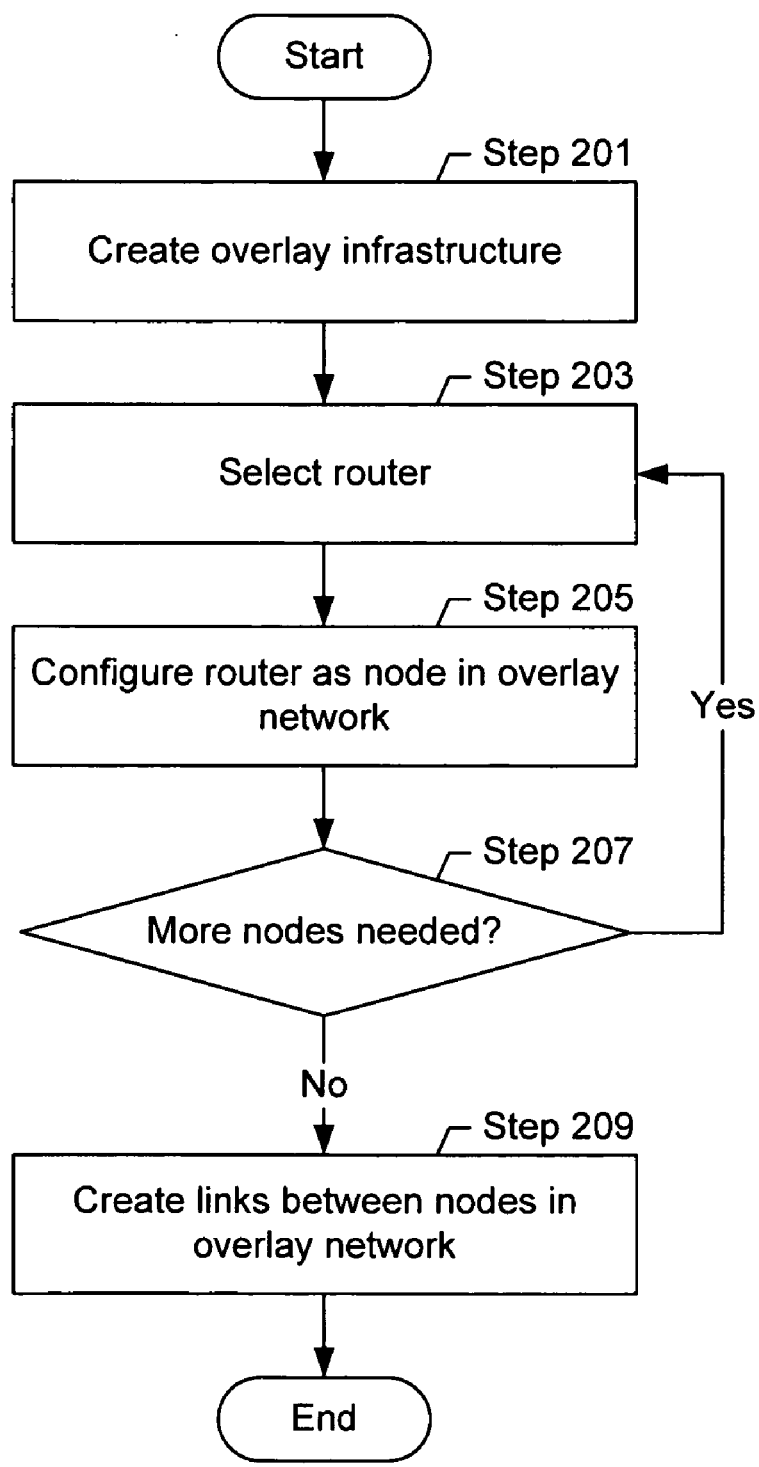
FIGS. 2-4 show flow diagrams in accordance with one or more embodiments of the invention.

FIG. 2 shows a flow diagram of overlay network setup in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, the overlay infrastructure is created (Step 201). The overlay infrastructure may include the network topology of the overlay network, selection of the nodes and links in the overlay network, creation of a hash function and keys for nodes in the overlay network, etc. Those skilled in the art will appreciate that various methods exist for creating an overlay infrastructure. For example, Chord uses a ring topology network with consistent hashing and a routing table for each node in the overlay network.

Alternatively, a CAN uses a virtual multi-dimensional Cartesian coordinate space on a torus of the same dimensionality. The coordinate space is partitioned among the nodes of the overlay network such that each node is associated with a distinct zone within the coordinate space. Keys are mapped onto points in the coordinate space using a uniform hash function and stored at the nodes owning the zones at which the points lie.

Once the overlay infrastructure has been created, a router is selected as a node in the overlay network (Step 203). The router may be selected based on geographic location, accessibility, configurability, etc. The router is also configured as a node in the overlay network (Step 205). Configuration may involve assigning a key to the router, installing software related to the overlay network on the router, creating a routing table, etc. A determination then made about whether additional nodes are required in the overlay network (Step 207). Alternatively, routers may join the overlay network by contacting routers that are already on the overlay network and requesting permission to join. Those skilled in the art will appreciate that different numbers and locations of nodes may be used depending on the desired characteristics of the overlay network.

If additional nodes are required, the process proceeds to Step 203. Alternatively, if no additional nodes are required, then the process proceeds to Step 209. Links between the nodes are also created (Step 209). As mentioned previously, nodes and links may be created differently for different types of overlay networks. As a result, logical links between nodes may be created between two random nodes or according to a specific network topology. For example, two nodes that become aware of one another may choose to link to one another. However, a fully connected network topology will include links from each node to every other node in the overlay network. In addition, logical links between nodes may be created or broken based on cost functions for creating the links, transporting network traffic on the links, etc. Those skilled in the art will appreciate that an overlay network may be constantly changing due to the addition or removal of nodes and/or links between the nodes. As a result, the overlay network may continue to be updated while in use.

Figure 3:
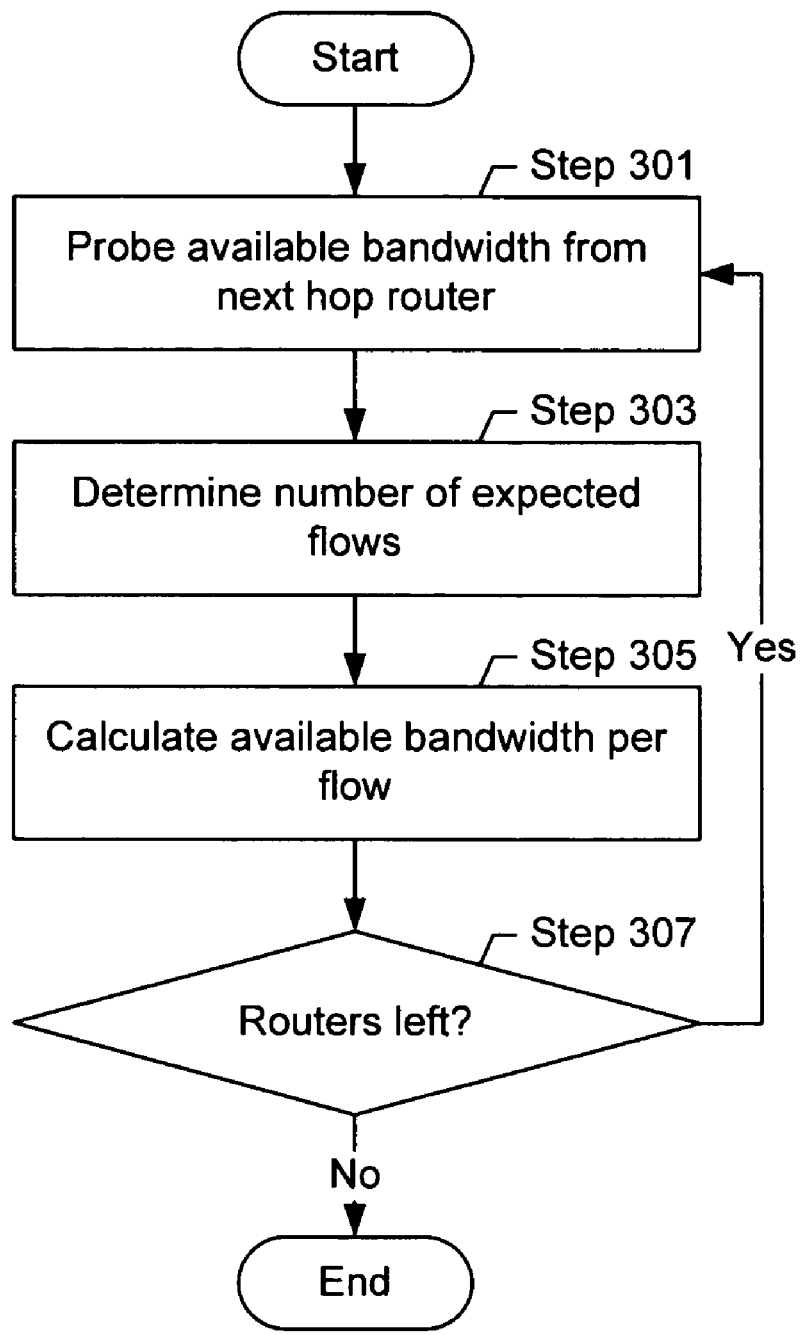

FIG. 3 shows a flow diagram of available bandwidth per flow calculation in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention. In one or more embodiments of the invention, the steps in FIG. 3 may be performed upon receipt of a bandwidth update trigger. As mentioned above, a bandwidth update trigger may occur at preset intervals, such as every five minutes, or a bandwidth update trigger may occur when the overlay network is changed (e.g., addition or deletion of new nodes, etc.).

In one or more embodiments of the invention, the steps in FIG. 3 are performed for every router in the overlay network of FIG. 1. Alternatively, if the overlay network includes a large number of nodes and links between nodes, only certain routers are selected to perform available bandwidth calculation upon receipt of a bandwidth update trigger. For example, a randomization algorithm may be used to select a group of routers and/or paths for bandwidth probing and calculation at every bandwidth update trigger. In addition, latency may be used to determine which routers to probe for available bandwidth. For example, if a router is selected to calculate available bandwidth by probing nearby routers, network latency may be used to determine which routers are close enough to be probed.

Initially, a next hop router is probed by the router for available bandwidth (Step 301). As described above, available bandwidth may be probed using tools such and techniques such as netest, pathChirp, Pathload, and Spruce. The number of expected flows is also determined between the router and next hop router (Step 303). The number of expected flows may be estimated by examining historical network traffic data obtained, for example, using MRTG, as well as incoming flow patterns. For example, if historical network traffic data indicates the presence (or anticipated presence) of seven flows between the two routers, but incoming flow patterns have been consistently higher, the number of expected flows may be estimated as higher than seven. In one or more embodiments of the invention, statistical estimation techniques may be used to estimate the number of expected flows.

The available bandwidth per flow is calculated (Step 305) from the available bandwidth and number of expected flows. As described above, the available bandwidth per flow may be calculated by dividing the available bandwidth between the two routers by the number of expected flows between the two routers. For example, if an available bandwidth of 580 Mb/s is probed from the next hop router, and the number of expected flows is estimated at seven, the available bandwidth per flow is calculated as 580 Mb/s divided by seven, or 82.85 Mb/s.

At this stage, a determination is made about whether any routers are left to probe (Step 307). In other words, if the router is linked to other next-hop routers in the overlay network, the available bandwidth is probed (Step 301) from those next-hop routers, the number of expected flows between the router and the next-hop routers is determined (Step 303), and the available bandwidth per flow is calculated (Step 305) until available bandwidths per flow have been determined for all routers connected to the router by a logical link.

Figure 4:
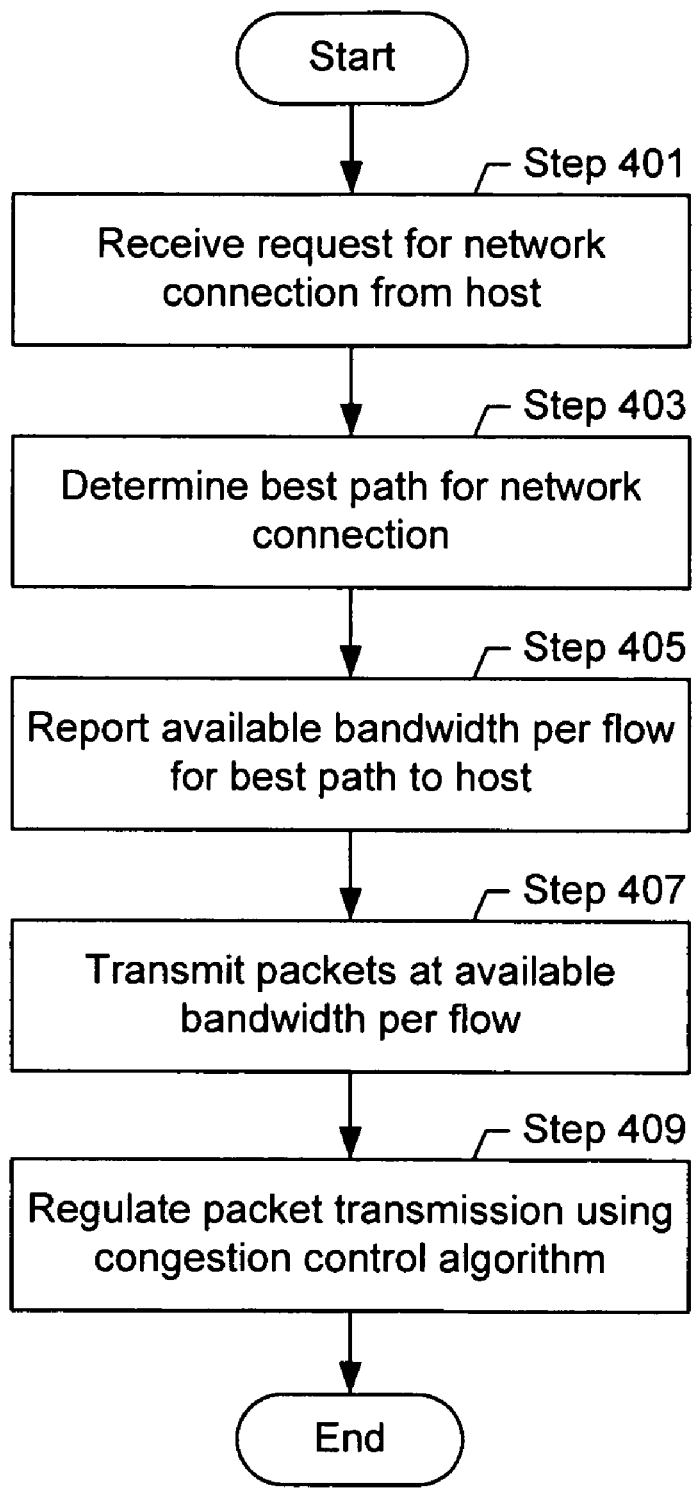

FIG. 4 shows a flow diagram of network connection management in accordance with one or more embodiments of the invention. In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, a request for a network connection is received from a host (Step 401) by a router in the overlay network. For example, the host may be trying to connect to another host on the overlay network in order to transmit data packets to the other host and/or receive data packets from the other host. The best path is determined for the connection between the two hosts (Step 403). As mentioned above, the best path may correspond to the path that provides the highest available bandwidth per flow between the two hosts. Alternatively, other criteria, such as packet loss rate, round trip time, number of hops, etc. may be used to determine the best path. In addition, the overall available bandwidth per flow for a path may be taken as the lowest available bandwidth per flow found on any segment of the path. On the other hand, available bandwidth per flow may also be based on the priority of the network connection. For example, if the network connection is of a high priority, more available bandwidth per flow may be allocated to the network connection than a network connection of a lower priority. Priority of a network connection may be determined, for example, by the amount of access to the overlay network by either host, the amount and type of data sent over the network connection, characteristics of other network connections, etc.

The available bandwidth per flow for the best path is reported to the host (Step 405). As stated above, the available bandwidth per flow may be embedded in a SYN-ACK or ACK packet sent to the host by the other host. The host then begins transmitting packets at the available bandwidth per flow (Step 407). Subsequent packet transmission is handled by a congestion control algorithm (Step 409). For example, an available bandwidth per flow of 50 Mb/s is reported to the host. Packets are initially transmitted from the host at 50 Mb/s, but packet loss is experienced after a few seconds. The congestion control algorithm implemented on the host may then modulate the rate of transmission to avoid packet loss. Examples of congestion control algorithms include transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), HighSpeed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), etc.

Figure 5:
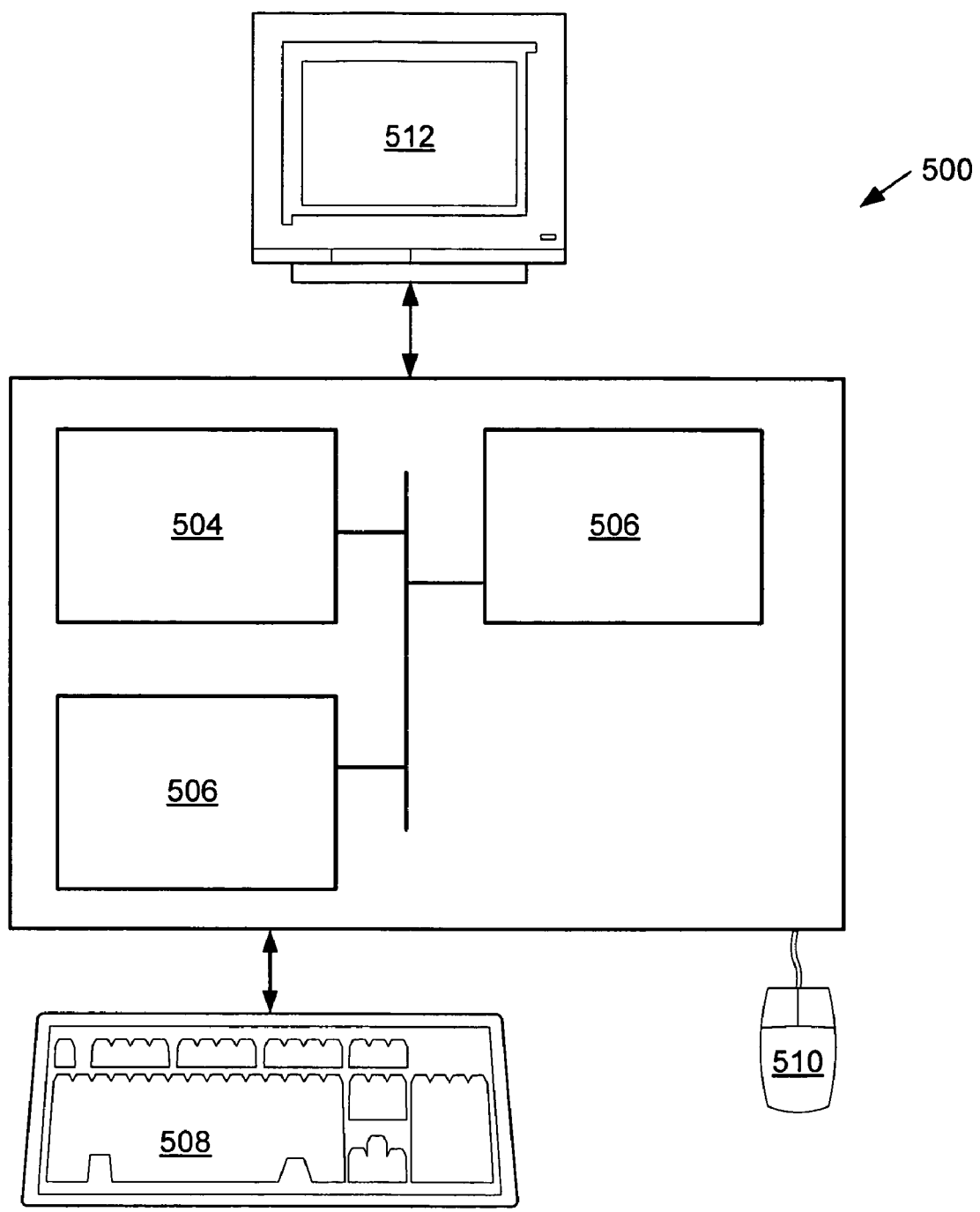
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., hosts, routers, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a network connection, comprising:
   receiving a request to establish the network connection from a host by a first router, wherein the network connection is associated with an overlay network, wherein the overlay network is a distributed hash table network, and wherein the overlay network comprises a plurality of routers and wherein the first router is one of the plurality of routers;
   sending, in response to the request, a first available bandwidth per flow to the host from the first router;
   establishing, in response to the request, the network connection;
   receiving, after establishing the network connection, packets from the host over the network connection, wherein an initial packet transmission rate of the packets over the network connection is based on the first available bandwidth per flow,
   wherein prior to sending the first available bandwidth per flow to the host, the first available bandwidth per flow is obtained by the first router by:
      probing a second router to obtain a first available bandwidth associated with the second router,
      receiving, from the second router, an initial packet comprising an initial packet header, wherein the initial packet header comprises the first available bandwidth,
      obtaining a first number of expected flows between the first router and the second router from historical data obtained from the overlay network, and
      calculating the first available bandwidth per flow using the first available bandwidth and the first number of expected flows.

2. The method of claim 1, further comprising:
   probing a third router of the plurality of routers in the overlay network for a second available bandwidth;
   receiving, from the third router, a second packet comprising a second packet header, wherein the second packet header comprises the second available bandwidth;
   determining a second number of expected flows between the first router and the third router;
   calculating a second available bandwidth per flow based on the second available bandwidth and the second number of expected flows;
   determining a best path for the network connection based on the first available bandwidth per flow and the second available bandwidth per flow, wherein the best path is associated with a best available bandwidth, and wherein the best available bandwidth is one selected from a group consisting of the first available bandwidth per flow and the second available bandwidth per flow; and
   sending the best available bandwidth for the best path to the host,
   wherein the network connection is associated with the third router, and
   wherein the initial packet transmission rate is further based on the best available bandwidth.

3. The method of claim 2, wherein packets from the host are routed using the best path for the network connection.

4. The method of claim 1, wherein a subsequent packet transmission rate over the network connection is regulated by a congestion control algorithm.

5. The method of claim 1, wherein the second router is probed upon receiving a bandwidth update trigger.

6. The method of claim 5, wherein the bandwidth update trigger comprises a set period of time from a last bandwidth update trigger.

7. The method of claim 1, wherein the first number of expected flows is further obtained using historical network traffic data between the first router and the host.

8. The method of claim 1, wherein the first available bandwidth per flow is based on a priority of the network connection.

9. A system, comprising:
   an overlay network, comprising:
      a plurality of routers comprising a first router and a second router; and
      a plurality of logical links connecting each of the plurality of routers to at least one of the other plurality of routers,
   wherein the overlay network is a distributed hash table network, and
   wherein the overlay network is configured to:
      receive a request by a first router of the plurality of routers to establish a network connection from a host, wherein the network connection is associated with the overlay network;
      send, in response to the request, a first available bandwidth per flow to the host;
      establish, in response to the request, the network connection;
      receive, after establishing the network connection, packets from the host over the network connection, wherein an initial packet transmission rate of the packets over the network connection is based on the first available bandwidth per flow, wherein prior to sending the first available bandwidth per flow to the host, the first available bandwidth per flow is obtained by the first router by:
  probing a second router to obtain a first available bandwidth associated with the second router,
  receiving, from the second router, an initial packet comprising an initial packet header, wherein the initial packet header comprises the first available bandwidth,
  obtaining a first number of expected flows between the first router and the second router from historical data obtained from the overlay network, and
  calculating the first available bandwidth per flow using the first available bandwidth and the first number of expected flows.

10. The system of claim 9, wherein the overlay network is further configured to:
  probe a third router from the plurality of routers for a second available bandwidth;
  receive, from the third router, a second packet comprising a second packet header, wherein the second packet header comprises the second available bandwidth;
  determine a second number of expected flows between the first router and the third router;
  calculate a second available bandwidth per flow based on the second available bandwidth and the second number of expected flows;
  determine a best path for the network connection based on the first available bandwidth per flow and the second available bandwidth per flow, wherein the best path is associated with a best available bandwidth, and wherein the best available bandwidth is one selected from a group consisting of the first available bandwidth per flow and the second available bandwidth per flow; and
  send the best available bandwidth for the best path to the host,
  wherein the network connection is associated with the second router, and
  wherein the initial packet transmission rate is further based on the best available bandwidth.

11. The system of claim 10, wherein packets from the host are routed by the overlay network using the best path for the network connection.

12. The system of claim 9, wherein a subsequent packet transmission rate over the network connection is regulated by a congestion control algorithm.

13. The system of claim 9, wherein the second router is probed upon receiving a bandwidth update trigger.

14. The system of claim 13 wherein the bandwidth update trigger comprises a set period of time from a last bandwidth update trigger.

15. The system of claim 9, wherein the first number of expected flows is further obtained using historical network traffic data between the first router and the host.

16. The system of claim 9, wherein each of the logical links comprises at least one physical link between a first of the plurality of routers and a second of the plurality of routers.

17. A computer readable medium containing software instructions for executing a method for receiving a request to establish the network connection from a host by a first router, wherein the network connection is associated with an overlay network, wherein the overlay network is a distributed hash table network, and wherein the overlay network comprises a plurality of routers and wherein the first router is one of the plurality of routers;
  sending, in response to the request, a first available bandwidth per flow to the host from the first router;
  establishing, in response to the request, the network connection;
  receiving, after establishing the network connection, packets from the host over the network connection, wherein an initial packet transmission rate of the packets over the network connection is based on the first available bandwidth per flow,
  wherein prior to sending the first available bandwidth per flow to the host, the first available bandwidth per flow is obtained by the first router by:
    probing a second router to obtain a first available bandwidth associated with the second router,
    receiving, from the second router, an initial packet comprising an initial packet header, wherein the initial packet header comprises the first available bandwidth,
    obtaining a first number of expected flows between the first router and the second router from historical data obtained from the overlay network, and
    calculating the first available bandwidth per flow using the first available bandwidth and the first number of expected flows.

18. The computer readable medium of claim 17, the method further comprising:
  probing a third router of the plurality of routers in the overlay network for a second available bandwidth;
  receiving, from the third router, a second packet comprising a second packet header, wherein the second packet header comprises the second available bandwidth;
  determining a second number of expected flows between the first router and the third router;
  calculating a second available bandwidth per flow based on the second available bandwidth and the second number of expected flows;
  determining a best path for the network connection based on the first available bandwidth per flow and the second available bandwidth per flow, wherein the best path is associated with a best available bandwidth, and wherein the best available bandwidth is one selected from a group consisting of the first available bandwidth per flow and the second available bandwidth per flow; and
  sending the best available bandwidth for the best path to the host,
  wherein the network connection is associated with the third router, and
  wherein the initial packet transmission rate is further based on the best available bandwidth.

* * * * *